(12) United States Patent
Yan

(10) Patent No.: US 10,738,816 B2
(45) Date of Patent: Aug. 11, 2020

(54) REUSEABLE SINGLE GROOVE RIVET SYSTEM AND METHOD

(71) Applicant: Shanghai Autocraft Co., Ltd., Shanghai (CN)

(72) Inventor: Cunlu Yan, Shanghai (CN)

(73) Assignee: Shanghai Autocraft Co., Ltd., Shanghai (CN)

( * ) Notice: Subject to any disclaimer, the term of this patent is extended or adjusted under 35 U.S.C. 154(b) by 287 days.

(21) Appl. No.: 16/021,334

(22) Filed: Jun. 28, 2018

(65) Prior Publication Data

US 2019/0003506 A1 Jan. 3, 2019

(30) Foreign Application Priority Data

Jun. 28, 2017 (CN) .......................... 2017 1 0509822

(51) Int. Cl.
*F16B 19/00* (2006.01)
*F16B 19/05* (2006.01)
*B21J 15/02* (2006.01)

(52) U.S. Cl.
CPC ............. *F16B 19/05* (2013.01); *B21J 15/022* (2013.01); *F16B 19/00* (2013.01)

(58) Field of Classification Search
CPC .. F16B 5/04; F16B 19/00; F16B 19/04; F16B 19/05; F16B 19/08; F16B 19/1027; F16B 21/00; F16B 21/086; B21J 15/022; Y10T 24/3613; Y10T 29/49943; Y10T 29/49956
USPC ................. 411/360, 361, 362, 500–501, 505
See application file for complete search history.

(56) References Cited

U.S. PATENT DOCUMENTS

| | | | | |
|---|---|---|---|---|
| 2,531,048 A | * | 11/1950 | Huck | B21J 15/022 411/361 |
| 3,025,730 A | * | 3/1962 | Brilmyer | B21J 15/022 29/240 |
| 3,057,246 A | * | 10/1962 | Brilmyer | B21J 15/022 411/361 |
| 3,066,568 A | * | 12/1962 | Armour | F16B 19/05 411/361 |
| 3,122,050 A | * | 2/1964 | Wenson | F16B 19/05 411/361 |
| 3,295,404 A | | 1/1967 | Baker et al. | |

(Continued)

FOREIGN PATENT DOCUMENTS

| | | |
|---|---|---|
| CN | 101912941 B | 5/2012 |
| CN | 104769293 B | 12/2016 |

*Primary Examiner* — Roberta S Delisle
(74) *Attorney, Agent, or Firm* — Sughrue Mion, PLLC

(57) ABSTRACT

A reusable single groove riveting system includes a single groove riveting bolt and a collar, and a method of use thereof as well as installation and removal methods thereof. A pull groove has a variable section feature along the axial direction so a collet and the single groove can automatically align during installation; the variable section can reduce the stress concentration effects along the single groove structure and avoid stuck problems. While raising the strength of the collar flange, the design feature of the axial installation force indicator is added. The single groove structure will not receive any extra load from the tool during disassembly or removal process so the rivet bolt can be reused after the disassembly. In the event the bolt pull groove is accidently damaged or the work space is limited, the collar can be effectively removed from the joint with this disassembly or removal method.

10 Claims, 7 Drawing Sheets

(56) References Cited

U.S. PATENT DOCUMENTS

| | | | | |
|---|---|---|---|---|
| 4,136,596 A | * | 1/1979 | Davis, Jr. | F16B 19/05 |
| | | | | 411/360 |
| 4,208,943 A | * | 6/1980 | Smith | F16B 19/05 |
| | | | | 411/361 |
| 4,221,152 A | * | 9/1980 | Jason | F16B 19/05 |
| | | | | 411/360 |
| 4,867,625 A | * | 9/1989 | Dixon | F16B 19/05 |
| | | | | 411/361 |
| 7,293,339 B2 | | 11/2007 | Mercer et al. | |
| 2003/0190215 A1 | * | 10/2003 | Harbin | B21J 15/022 |
| | | | | 411/361 |

* cited by examiner

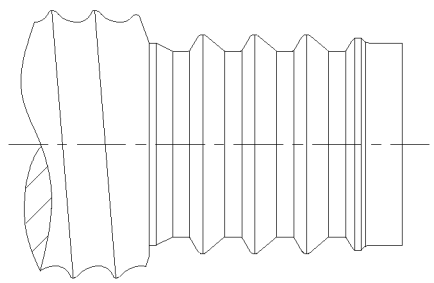
Figure 15 (Conventional)

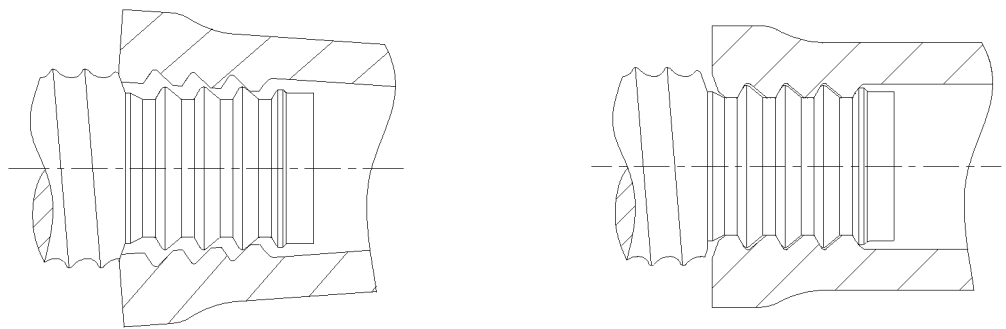
Figure 16 (Conventional)

REUSEABLE SINGLE GROOVE RIVET SYSTEM AND METHOD

BACKGROUND OF THE INVENTION

Field of the Invention

The present invention belongs to mechanical processing technology and relates to a cold riveted joint technology, in particular to a reusable single groove rivet system and a method of use thereof, including a method of using an installation and removal tool.

Background Technology

The reusable single groove rivet system comprises a rivet bolt member and a mating collar member. It is used mainly in place of the bolting system of high strength bolted joints and welded structures and other applications.

In conventional embodiments, as disclosed in U.S. Pat. No. 7,293,339 B2, a problem of the no breaking-off lockbolt fastening system is that accumulative positioning error will incur incomplete engagement of the installation tool teeth with the short tail grooves, and the pull grooves may slide or be overloaded, resulting in damaged pull grooves and unexpected wear of the tool.

The plural pull groove structure lockbolt and pull teeth in conventional embodiments are very sensitive to the angled entrance of the installation tool towards the pull grooves. Therefore, the operator needs to ensure that the pull grooves and pull teeth are correctly engaged prior to activating the tool.

In addition, the pitch error and deviation of the pull grooves due to normal manufacturing errors and deviations tend to result in an uneven or non-uniform load distribution over the pull grooves and ribs. And therefore, higher local stress will lead to premature failure of the grooves and ribs.

Regarding the removal of the swage locked joint of the plural pull groove fastening system, the method of the conventional embodiment is to cut the collar into two pieces along the axial direction using a special removal tool. The cutting edges are symmetrically located along the axis of the removing tool. The pulling force of the plural groove short tail produces a reaction force for the cutting edges to cut the collar.

Since the collar has been hardened during installation, the force required for the cutting of the collar shall be bigger than that required for installation. Hence, the pull grooves will afford higher loads to produce bigger reaction forces and this tends to result in plastic deformation, damage, blocking and other modes of failure of the pull grooves and ribs.

On the one hand, the complex shape, high manufacturing cost and long inspection cycle of the removal tool result in a high removal cost. On the other hand, once pull grooves and ribs fail during the installation, the axial cutting of the collar cannot be accomplished with conventional embodiments.

Most importantly, the above listed problems of the fasteners in conventional embodiments severely affected the repeated use of the lockbolts.

SUMMARY OF THE INVENTION

To solve the above technical problems, the present invention discloses a reusable single groove riveting bolt and a method of use thereof. The method of use includes an installation method and a removal method which ensures the reusability of the riveting bolt. The invention aims to solve the problem that the positioning precision requirements and positioning method requirements of the conventional plural pull groove mechanism are too high.

On the one hand, a single and relatively large pull groove structure instead of a plurality of small pull grooves can lower the crucial requirements for the operator to axially position and angularly align the tool and the pull groove; therefore, labor intensity can be reduced and installation efficiency will be raised.

On the other hand, the single pull groove of the present invention is wider and deeper, it avoids accumulative pitch errors under the plural pull groove system, and reduces the influence of the manufacturing tolerances on the pull groove as well, rendering manufacturing simpler.

The present invention provides a collar which is to be used together with the single pull groove rivet bolt. With entire collar being thoroughly heat treated at different cooling speeds, different grades of collar hardness and strength can be more flexibly obtained. Indicators are added to the face of the collar flange to indicate the axial force exerted on the collar and joint members during installation.

The present invention also provides a device for installing said riveting bolt and collar, and a removal tool thereof, and the corresponding methods of installation and removal. The single pull groove riveting bolt removed from the joint can be reused.

Advantageous effects of the present invention include the following:

1) The single groove structure is easier to manufacture and inspect compared with a plurality of grooves. The use cost is thus lowered and the installation is more convenient.
2) When the single pull groove is inserted into the pull teeth of the installation tool at an angle, the groove and pull teeth can automatically align during installation. The error compatibility of the single pull groove is better.
3) The big groove width and big transitional radius between contour elements are adopted to evenly disperse the axial tension afforded by the installation tool, lessening the stress concentration effect of the conventional structure. Hence, the tool cost is lowered and service life is lengthened.
4) The entire collar is thoroughly heat treated. By adopting varied heating temperatures and cooling speeds, different grades of hardness and strengths can be flexibly obtained. What is more, the thorough and entire thermal treatment endows a higher level of uniform and isotropic properties with the collar.
5) Indicators are added to the collar flange plane to indicate axial forces applied to the joint members (plates or workpieces) by the collar during installation.
6) A removal method is put forward to ensure the reusability of the rivet bolt. The single groove structure of the rivet bolt does not receive any extra load of the tool during removal and the rivet bolt can be reused after the removal. Meanwhile, the removal method can be used to effectively remove the collar in case the pull groove is damaged unexpectedly.

BRIEF DESCRIPTION OF THE DRAWINGS

The present invention is better understood by reading the following description of preferred embodiments with reference to the attached drawings, in which:

FIG. 15 is a schematic view of the structure of the conventional plural pull groove lockbolt;

FIG. 16 is a schematic view of the structure of the conventional plural pull groove positioning and engagement.

Figure 1:
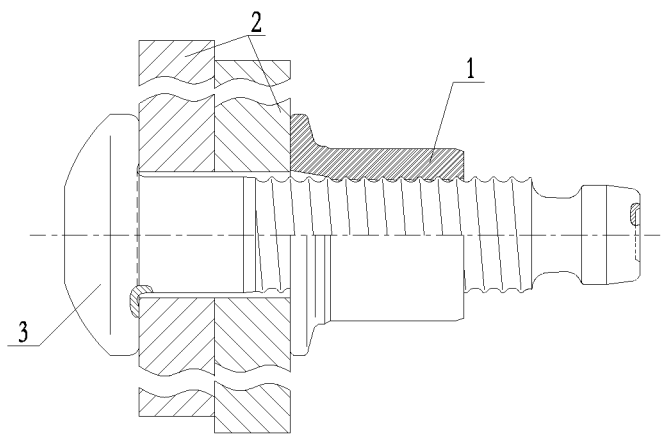
FIG. 1 is a schematic structural view of the reusable single groove rivet bolt and collar.
Figure 2:
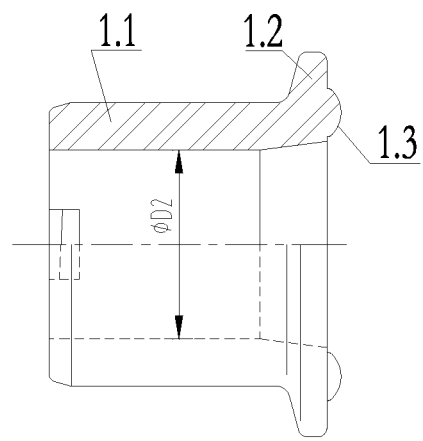
FIG. 2 is a schematic structural view of the collar.
Figure 3:
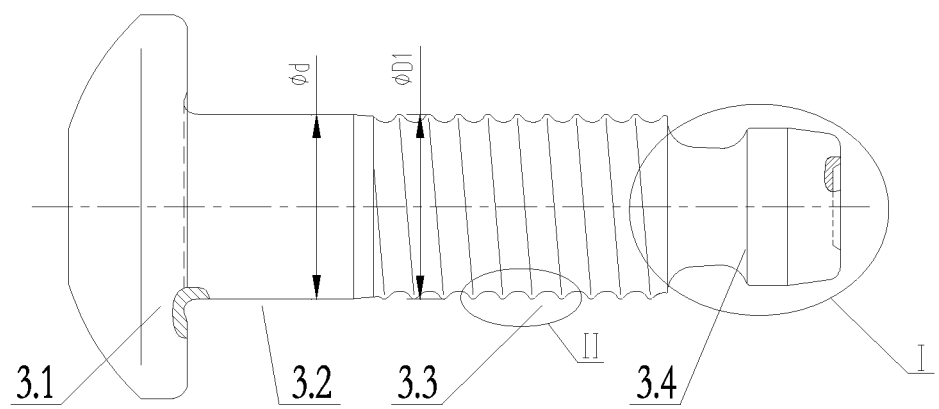
FIG. 3 is a schematic structural view of the single pull groove rivet bolt.
Figure 4:
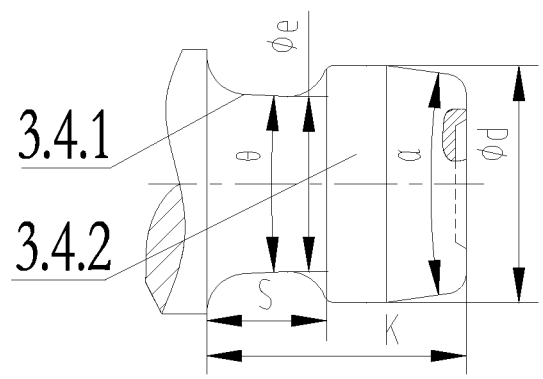
FIG. 4 is a schematic detail view of Portion I in FIG. 3.
Figure 5:
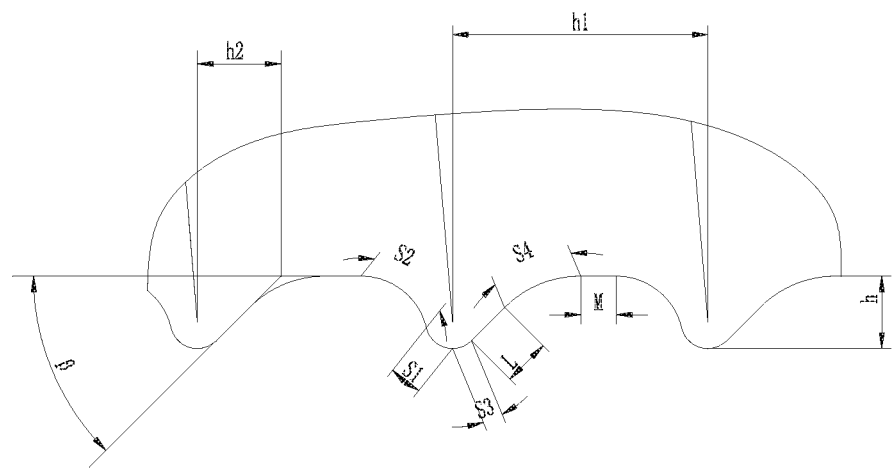
FIG. 5 is a schematic detail view of Portion II in FIG. 3.
Figure 6:
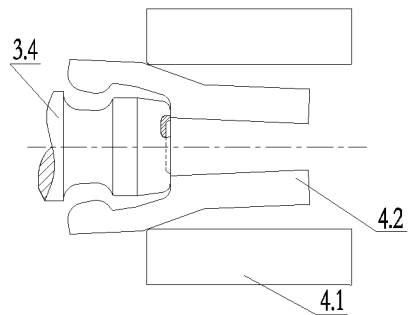
FIG. 6 illustrates the state that the tool assembly begins to engage the single groove tail.
Figure 7:
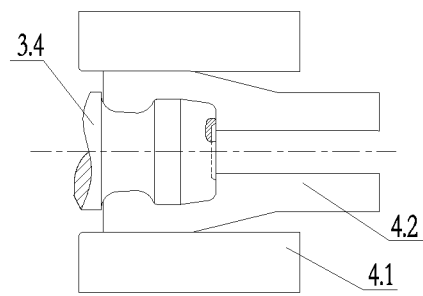
FIG. 7 illustrates the state that the tool assembly has engaged the single groove short tail.
Figure 8:
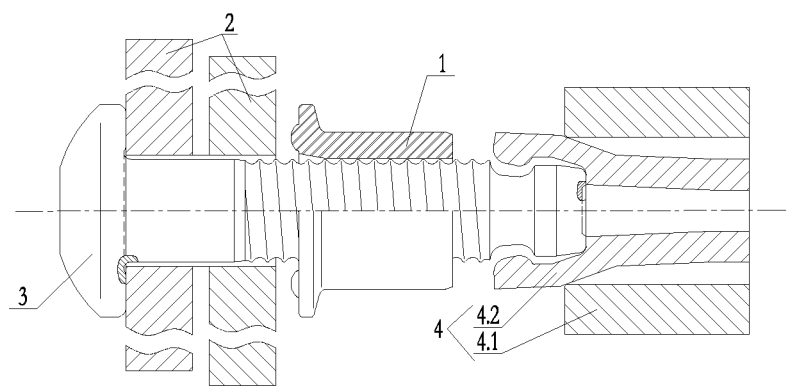
FIG. 8 illustrates the states corresponding to S102 and S103 of the installation process.
Figure 9:
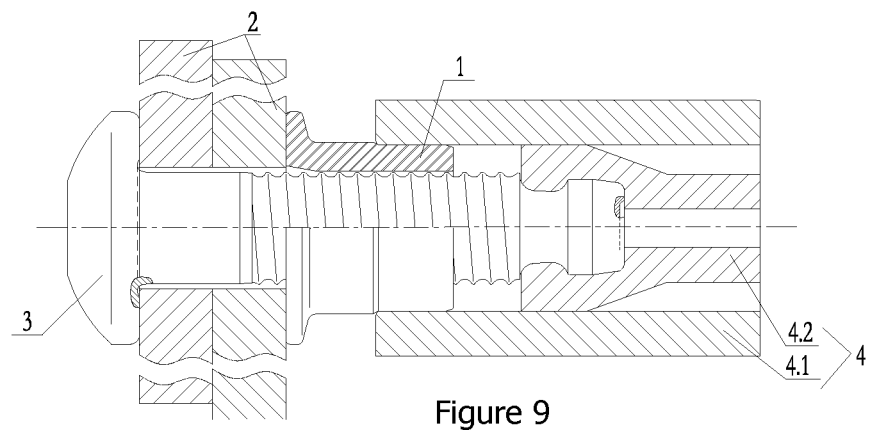
FIGS. 9 and 10 illustrate the state of S104 in the installation method.
Figure 10:
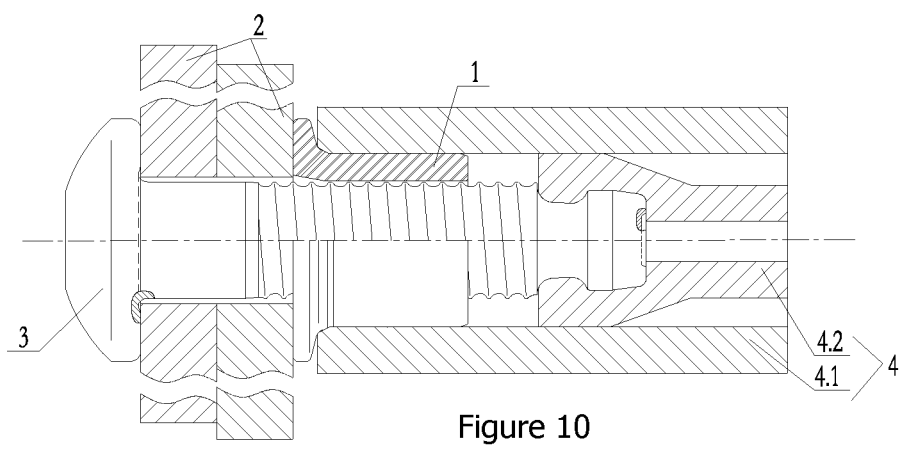
Figure 11:
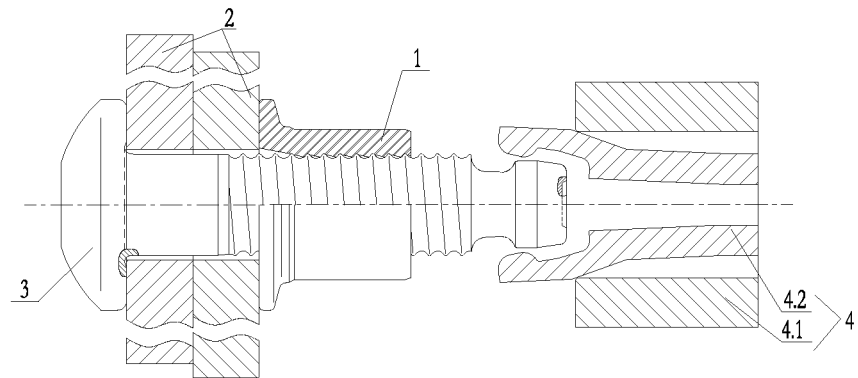
FIG. 11 illustrates the state corresponding to S105 in the installation method.
Figure 12:
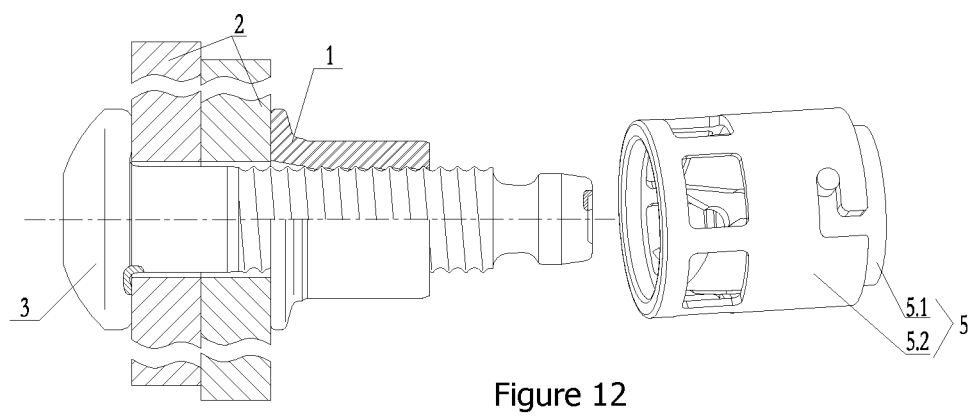
FIG. 12 is a schematic view of the radial cut of the collar in the removal method.
Figure 13:
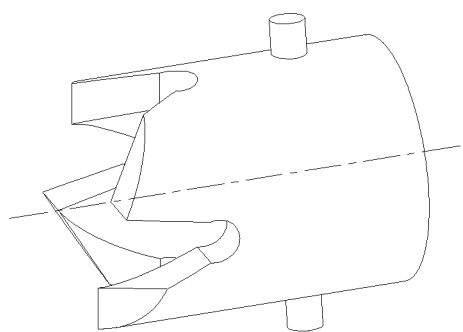
FIG. 13 is a schematic view of the structure of the one piece cutting tool.
Figure 14:
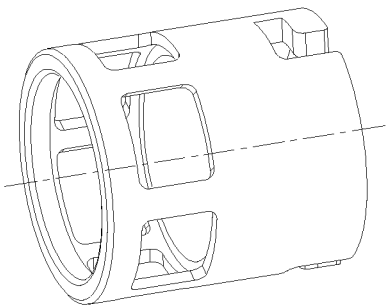
FIG. 14 is a schematic view of the structure of the guide sleeve equipped for the initial stage of cutting.

Referring now to the drawings as attached, the names of the parts or portions thereof which the designating numbers stand for are:
1. collar;
    1.1—round tube portion or barrel portion;
    1.2—flange or flange base;
    1.3—raised or projecting structures that can indicate axial forces;
2—joint members or workpieces or plates;
3—single groove rivet bolt;
    3.1—bolt head;
    3.2—cylindrical shank portion;
    3.3—thread portion;
    3.4—single groove short tail structure;
        3.4.1—single pull groove structure;
        3.4.2—raised or projecting pull tooth;
4—installation or setting tool;
    4.1—anvil;
    4.2—elastic collet;
5—collar removal tool components or set;
    5.1—one piece removal cutting tool structure;
    5.2—Guiding and positioning sleeve.

Meanings of other designating codes in this document are:
S—width of the single pull groove;
e—minimum (smallest) diameter of the pull groove (root);
k—axial length of the single pull groove short tail;
d—maximum (largest/biggest) diameter portion of the short tail;
θ—guiding angle of the single groove; α—short tail lead-in angle;
β—elevation angle;
h1—thread pitch;
h2—length of the front half teeth (the first half of the teeth);
h—thread form height;
S1—radiused crest surface of the rear half teeth (curved crest surface of the second half of the teeth);
S2—radiused root surface of the rear half teeth (the second half of the teeth);
S3—radiused crest surface of the front half teeth (curved crest surface of the first half of the teeth);
S4—radiused root surface of the front half teeth (the first half of the teeth);
L—inclined (angled) central surface of the front half teeth (the first half of the teeth);
M—cylindrical root portion.

DETAILED DESCRIPTION OF THE PREFERRED EMBODIMENTS

The invention will be further described below with reference to the drawings as attached. Embodiments of the present invention include but are not limited to the following examples.

Embodiment 1

As shown in FIGS. 1 to 5, this embodiment discloses a reusable single groove pull rivet bolt system, comprising a single groove rivet bolt (FIG. 3), a mating collar (FIG. 1). Said single groove rivet bolt includes a head (3.1) and threaded shank. Said threaded shank comprise a cylindrical portion (3.2), a threaded portion (3.3) and a single groove short tail (3.4), and said three portions are joined in sequence. Said collar (FIG. 1) comprises a flange base (1.2) and a barrel or round tubular portion (1.1). Said collar will be fitted on the threaded portion of the rivet bolt. Specifically
 1) said short tail is a single pull groove structure, including a smooth single pull groove (3.4.1) and raised or projecting pull teeth (3.4.2);
 2) the ratio of the single pull groove width to the short tail length is 0.4-0.52;
 3) the cross-sectional area of the single groove (3.4) is circular, and the ratio of the smallest cross-sectional area diameter to the largest cross-sectional area diameter is 0.7 to 0.9;
 4) the lead-in angle α of said short tail is between 12° and 20°;
 5) the collar flange front face (1.2) is provided with raised or projecting structures (1.3) to indicate axial forces and the projections are evenly distributed in radial directions;
 6) the collar is entirely through heat treated and different collar strengths can be obtained from different combinations of heating temperatures and cooling rates;
 7) an annular load relief groove or undercut is designed at the juncture of the bolt head (3.1) and the cylindrical shank portion (3.2);
 8) the ratio of the thread portion (φD1) of the rivet bolt to the inner diameter of the collar (φD2) is 0.95 to 0.99;
 9) spherical projections (1.3) are provided on the front face of the collar flange to indicate axial forces. After the collar is installed, the gap between the flange front end face and the joint member can be detected to determine whether the joint connection is valid or not;
 10) circumferential external threads (3.3) are provided on the thread portion of the rivet bolt. The surface of the external thread form is radiused or curved, and there is a cylindrical portion (M) in the root between adjacent thread forms;
 11) the thread form includes a front (or first) half tooth and a rear (or second) half tooth, and the front half tooth elevation angle is smaller than the projection profile of the rear half tooth; the elevation angle of the front half tooth is 45°; the ratio of the width of the front half tooth to the pitch is 0.29-0.35.

Embodiment 2

This embodiment discloses a reusable single groove pull rivet system and a method of use thereof, including an installation system and a collar removal system. Said installation system comprises a hydraulic station, an oil hose or pipe, a driving device, and a tool set for installation; said hydraulic station connects said driving devise with an oil hose or pipe, and said driving device connects the tool set for installation; the characteristics are:

Members of the installation tool set (FIG. 4) are wear parts and are designed into a modular structure that can be replaced and repaired separately. The installation tool set includes the anvil (4.1) and the elastic collet (4.2). The anvil is circular tube shaped and is relatively fixed onto the driving device. The elastic collet is located in the cavity of the anvil.

The elastic collet comprises a plurality of radially arranged gripping/clamping strips, and at the outer ends of the gripping or clamping strips are gripper teeth mating the pull groove contour.

The removal system includes a gun body module, collar cutting tool, guiding and positioning structure, and pneumatic/electric motor and so on, in which the cutting tool (5.1) is made from high-speed tool steel, and will obtain fairly good cutting and sharpening capabilities after heat treatment; the turning tool (5.1) and the positioning and guiding structure (5.2) are designed into modules and can effect rapid cutting of the collar. The cutting process will not produce extra load onto the single groove structure of the rivet bolt, and the rivet bolt is reusable after the collar is cut off.

Moreover, in case the pull groove is accidentally damaged during the installation process, the collar can be effectively removed with this removal method as well.

Embodiment 3

This embodiment discloses a specific method of using the installation and removal tool systems of Embodiment 2, which specifically includes the installation method of the single groove rivet bolt (FIG. 3) and the collar (FIG. 1), and the method to disassemble the joint after installation.

The installation method comprises the following steps:
1) S101: Place the rivet bolt (FIG. 3) through the openings of the joint members (workpieces or plates), rotate the collar (1) onto the bolt and locate it on the thread portion;
2) S102: Locate the short tail (3.4) in the mouth of the elastic collet (4.2) and let the gripping teeth of the elastic collet contact the short tail;
3) S103: Start the hydraulic station; Under the action of the driving rod, the elastic collet (4.2) moves into the anvil cavity; under the action of the anvil wall the elastic collet gripping teeth clamp the single pull groove (3.4) of the bolt, circumferentially engaging the groove;
4) S104: The elastic collet (4.2) continues to move inwards inside the anvil (4.1). The front end of the anvil contacts the front end of the barrel or round tubular portion (1.1) of the collar. The anvil applies axial pressure on the collar so the flange base (1.2) presses tightly against the joint members (plates or workpieces). When the axial force reaches the preset value, spherical projections indicating the axial force are flattened, the anvil (4.1) continues to move along the collar to radially extrude the barrel of the collar (1.1) locking the collar (1.1) into the thread (3.3) grooves of the bolt;
5) S105: The oil flow route inside the hydraulic station is switched, and the elastic collet (4.2) is restored under the action of the driving rod;
6) S106: The installation is completed, the system restores, and the hydraulic station stops running.

The removal method comprises the following steps:
1) S201: Locate and secure the guiding and positioning structure (5.2) of the removal set on the extruded portion (1.1) of the collar to effect the position locating and guiding before removal;
2) S202: Depress the button and hold it down, hold the handle and the gun body tightly, feed forward with proper force to start the first stage of cutting; remove 2-5 mm axially from the deformed barrel portion of the collar so the cutting tool structure can position and guide itself; stop cutting and remove the guiding and positioning structure;
3) S203: Start the second stage of cutting. The cutting tool structure (5.1) guides and positions itself. Continue cutting till the flange surface (1.2) of the collar;
4) S204: Use a hammer to gently knock the rivet bolt until it backs out of the mounting hole. The removal of the riveting fasteners is completed.

The above embodiments are well adapted to carry out the objects and attain the ends of the present invention. It is worthwhile to point out, while the presently preferred embodiments of the invention have been given for purposes of disclosure, numerous changes in the details of procedures for accomplishing the desired results, will readily suggest themselves to those skilled in the art, and which are encompassed within the spirit of the invention and the scope of the appended claims.

What is claimed is:
1. A reusable single groove pull riveting system including a single groove rivet bolt, and a mating collar,
wherein said single groove rivet bolt comprises a head and a shank, said shank comprising a cylindrical portion, a threaded portion and a single groove tail structure which are joined in sequence,
said mating collar comprises a flange and a circular tube portion,
said collar is to be installed on the threaded portion of the bolt,
wherein characteristics of the system are:
a) said short tail is a single groove structure, including a smooth profile single pull groove portion and a raised pull tooth portion;
b) the ratio of the width of said single pull groove to the length of the short tail is 0.4-0.5;
c) the cross sectional area of said single groove is circular, and the ratio of the outer diameter between the smallest cross sectional area and the largest cross sectional area is 0.7-0.9;
d) said short tail has a lead-in angle between 12° and 20°;
e) the collar flange has axial force indicating projection structures on a front face, said projection structures are evenly distributed in radial directions;
f) the collar is heat treated entirely and thoroughly and different strengths can be obtained through a combination of different heating temperatures and cooling rates.

2. The reusable single groove pull riveting system according to claim 1, wherein said single groove rivet bolt has an annular load relief groove at the juncture of the head and the cylindrical shank portion.

3. The reusable single groove pull riveting system according to claim 1, wherein said single groove rivet bolt and collar have a ratio between the diameter of the threaded shank portion, φD1, and the internal hole diameter of the collar, φD2, of 0.95-0.99.

4. The reusable single groove pull riveting system according to claim 1, wherein said collar has spherical projecting axial force indicators on the front face of the collar flange, and after the collar is installed, the gap between an end face of the flange and a joint member can be detected to determine whether joint is tightly secured or not.

5. The reusable single groove pull riveting system according to claim 1, wherein the threaded shank portion of said single groove rivet bolt is a plurality of external threads around a circumference of the shank, the surface of the thread form of said external threads is a curved surface, and there is a cylindrical root portion between adjacent threads.

6. The reusable single groove pull riveting system according to claim 5, wherein said thread form of said single groove rivet bolt comprises a front half tooth and a rear half tooth, wherein the front half tooth has an elevation angle β which is smaller than a projection profile of the rear half tooth, said front half tooth has an elevation angle β of 45°; and the ratio between the width and the pitch of said front half tooth is 0.29-0.35.

7. A tool for installing and removing the reusable single groove pull riveting system according to claim 1, comprising an installation system and a removal system, wherein the installation system includes a hydraulic station, an oil hose, a driving device and a tool set, said hydraulic station connecting the driving device with the oil hose, said driving device connecting said tool set for installation, wherein said tool set includes an anvil and an elastic collet, wherein said anvil is a round tube having a cavity and a wall and is fixed with the driving device, said elastic collet is inside the round tube cavity of the anvil, said elastic collet comprises a plurality of circumferentially arranged clamping strips, and outer ends of the clamping strips are gripper teeth in a shape mating tail groove contour, said driving device has a driving rod connected onto the collet, and said removal system includes a gun body member, a turning tool member, a guiding and positioning member, and a pneumatic/electric motor member.

8. A method of installing a single groove rivet bolt by using the tool according to claim 7, comprising the following steps:

1) S101: Placing the rivet bolt through openings in joint members, rotating the collar onto the bolt and locating it on the thread portion;
2) S102: Locating the short tail in mouth of the elastic collet and letting the gripping teeth of the elastic collet contact the short tail;
3) S103: Starting the hydraulic station; under the action of a driving rod, the elastic collet moves into the anvil cavity; under the action of the anvil wall the elastic collet gripping teeth clamp the single pull groove of the bolt, circumferentially engaging the groove;
4) S104: Continuing to move the elastic collet inwards inside the anvil, wherein the front end of the anvil contacts the front end of the round tube portion of the collar, the anvil applies axial pressure on the collar so the flange presses tightly against the joint members, when the axial force reaches a preset value, spherical projections indicating the axial force are flattened, the anvil continues to move along the collar to radially extrude the barrel of the collar locking the collar into the thread grooves of the bolt;
5) S105: Switching the oil flow route inside the hydraulic station, and the elastic collet is restored under the action of the driving rod;
6) S106: Completing the installation, restoring the system, and stopping the hydraulic station from running.

9. The method according to claim 8, wherein the joint members are plates or workpieces.

10. A method of removing a single groove rivet bolt by using the tool according to claim 7, comprising the following steps:

1) S201: Locating and securing the guiding and positioning member of the removal system on the extruded portion of the collar to effect the position locating and guiding before removal;
2) S202: Depressing power button and holding it down, holding a handle and the gun body member tightly, feeding forward with proper force to start the first stage of cutting; removing 2-5 mm axially from deformed circular tube portion of the collar so the cutting tool structure can position and guide itself; stopping cutting and removing the guiding and positioning member;
3) S203: Starting the second stage of cutting, wherein the cutting tool structure guides and positions itself, continuing cutting until the flange of the collar is reached;
4) S204: Using a hammer to gently knock the rivet bolt until it backs out of the mounting hole, and completing removal of the riveting fasteners.

* * * * *